July 24, 1928.  
C. E. NORTH  
1,678,478  
PROCESS OF CHURNING CREAM INTO BUTTER FAT AND APPARATUS THEREFOR  
Original Filed Jan. 27, 1925
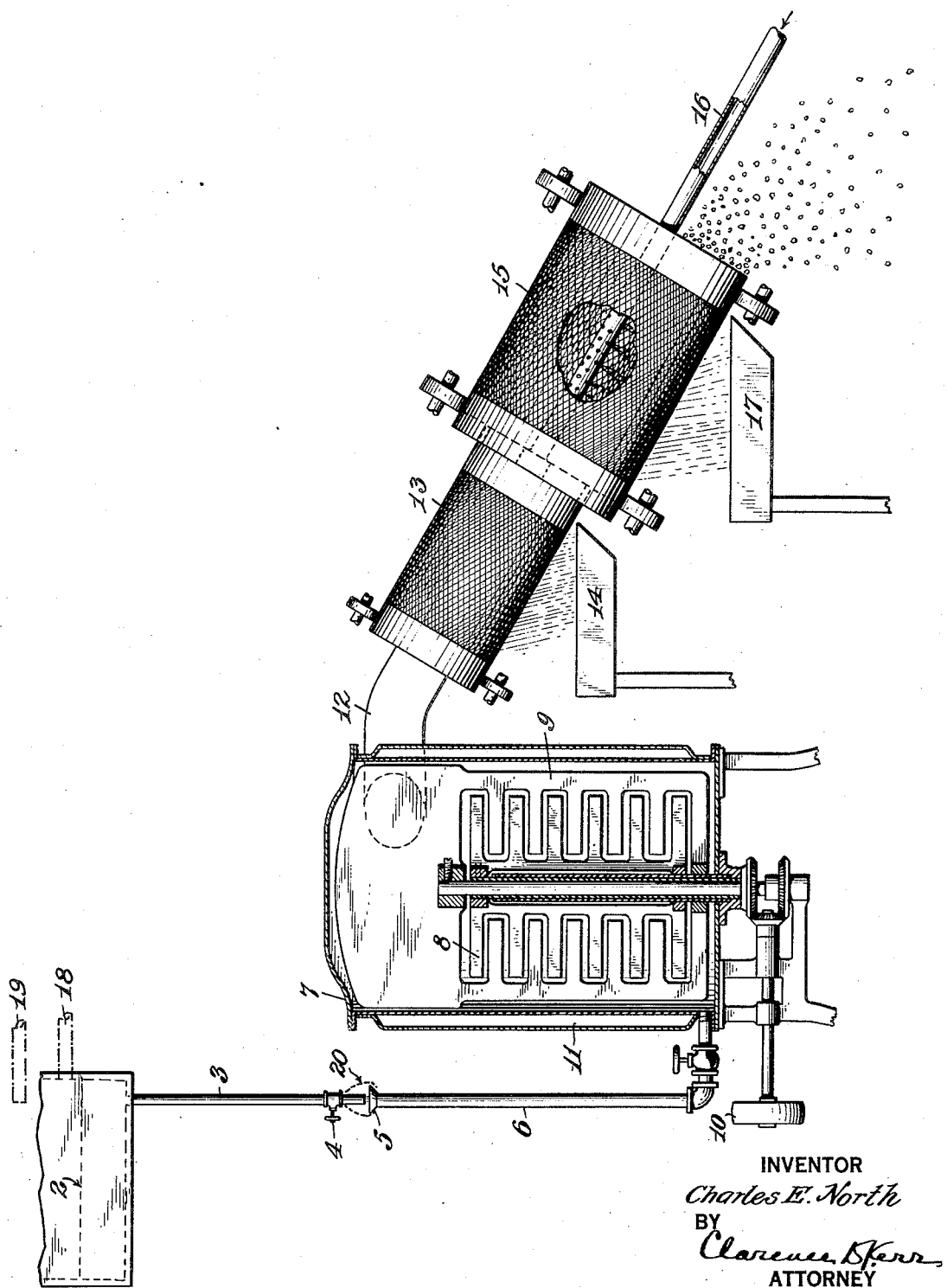
INVENTOR  
Charles E. North  
BY  
Clarence B. Kerr  
ATTORNEY Patented July 24, 1928.

1,678,478

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF CHURNING CREAM INTO BUTTER FAT AND APPARATUS THEREFOR.

Application filed January 27, 1925, Serial No. 5,172. Renewed January 4, 1928.

Figure 1 is a section of apparatus, suitable for carrying out my process.

My invention relates to the production of butter fats by the continuous churning of cream in an agitator in which the cream is fed in as continuously as is necessary to keep the machine supplied and the butter fats are withdrawn therefrom at a continuous rate.

It has been the practice in the manufacture of butter to effect churning by the use of large horizontal revolving barrels, containing one or more interior baffles, which are rotated slowly by machinery at a rate of about 40 revolutions per minute for a period of approximately thirty-five minutes, this being the usual time required for the churning of butter from cream and the period generally recognized by manufacturers of butter as being the time necessary for the production of commercial butter. The manufacture of butter by such a process of churning is not continuous and is interrupted by the stopping of the churns so that they may be emptied of the agglomerated butter fat and butter-milk and again filled with fluid cream.

Not only is the operation of my process continuous, but the percentage of recovery of the butter fats is extremely high, and the operation is extremely rapid. My invention also comprises the various features which I shall hereinafter describe and claim.

A typical method of carrying out my improved process in connection with the apparatus illustrated in the drawing is to be described as follows: The cold cream flows from the tank 2 down through the pipe 3, in which the feed of the cream is controlled by the valve 4, into the funnel 5 of the inlet 6 of the churn 7, which has a jacket 11 for a cooling medium such as water or brine. The cream is fed into the churn continuously, or at such a rate as to keep the churn filled by a gravity feed or by any suitable means for maintaining pressure. Within the churn 7 the cream is agitated or whipped by the paddles 8 and 9, which are driven by the pulley 10 and revolve in opposite directions, preferably at an extremely high rate of speed as compared with the speed at which churns are normally operated commercially, and in its passage up through the churn, the cream is subjected to the agitation necessary to bring about the substantially complete agglomeration of the fats.

The agglomerated fat granules and butter-milk are fed out of the churn outlet 12 into a wire mesh filter or hollow cylinder 13 which is downwardly inclined. As the cylinder 13 is rotated the butter-milk drains through the meshes of the wire screen forming the sides of the filter into the trough 14, and the agglomerated fat granules, freed from the butter-milk, move by rolling and sliding down through the revolving cylinder 13. The residue, which is substantially all butter fat in the form of granules or masses, is discharged from the cylinder 13 into a second wire mesh revolving cylinder 15, in which it is subjected to a spray or wash of cold water, preferably from jets discharging through holes in a pipe which is also the central shaft 16 of the cylinder 15. The wash water drains off through the meshes of the wire into the trough 17. The rotation of the inclined cylinder 15 effects the movement of the fat granules or masses which are discharged through the lower end of the cylinder. The fat granules or masses may be then run into a butter worker (not shown) where the granules or masses may be salted and worked.

The cylinders 13 and 15 may be driven by any suitable means at the same or varying rates of speed.

The foregoing operations of churning the cream, draining the buttermilk and washing the agglomerated butter fats, are effected continuously, and may be conducted with extreme rapidity. In fact, the time required for the churning, draining and washing of any portion of the cream and of the resulting fat by my continuous process may be accomplished in less than five minutes, in contrast with approximately forty-five to fifty minutes, which is the rate of time required in the present largely used commercial processes.

The speed of the operation depends largely on the speed at which the churn is revolved. For instance, I have obtained good results by rotating the churn at a speed of 1,000 R. P. M., in which cases the agglomeration of the fat was effected in about two minutes. It will be seen that the rate of flow of the cream from the supply tank controls the rate at which the fat proceeds through the churn, the drainer and the washer, and that the rate of rotation of the paddles in the churn and of the revolution of the sieves 13 and 15 may also be controlled and adjusted.

The cream in the churn is constantly forced upward by the contents of the incoming cream and outward by the centrifugal force of the revolving paddles. This centrifugal force tends to increase toward the periphery of the paddles and to drive the cream outwardly away from the center, with the result that the material under treatment is fed upwardly in the shape of an inverted bell, there being a space within the bell in the shape of a hollow inverted cone.

My continuous process may be employed for either sweet or sour cream, and to be effective must be carried out at a low temperature of from approximately 40 to 60° F., a temperature of about 50° being preferable, which is maintained by the cooling medium in the jacket 11 of the churn. The agglomeration or collection of the fat globules in cream is best accomplished at such low temperature, because the fat is then hardened and under the mechanical impulse of agitation such as churning the fat globules are not broken up but stick together and form larger and larger clusters. This action in the case of sour cream is intensified, as the casein is coagulated, with the result that the milk serum has been freed and left in a more liquid condition than is the case in sweet cream, with the result that the fat globules are more easily removable and more easily brought into contact by agitation, and as a result the agglomeration of the milk fat is normally more complete with sour cream than with sweet cream.

It is sometimes desirable to replace the air in the tank 2 by an inert gas. In such case the gas and cream may be introduced into the tank, which will then be closed, through pipes 18 and 19. The opening between the pipe 3 and funnel 5 will also be closed, as is indicated at 20 in dotted lines. As in the preferred method, the flow of cream will be controlled by the valve 4.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The process of obtaining butter fats, which comprises continuously feeding cream to one part of a column of cream and displacing cream in said column; applying to said cream in its movement of displacement rotative impulses in opposite directions, thereby agitating the cream; so proportioning the strength of said impulses to the rate of feed as to effect thoroughly the agglomeration of the fats contained in the cream; displacing the treated material in the form of agglomerated fats and butter-milk out of the agitating zone; and removing such treated material continuously and automatically.

2. The process of obtaining butter fats, which comprises continuously feeding cream into an agitating zone; agitating it therein to effect the agglomeration of the butter fats in the cream; continuously displacing the agglomerated fats and the residue from the agglomerating zone by feeding additional cream into such zone; and maintaining the rate of feed of cream to ensure such displacement after separation into butter fats and a residue.

3. The process of obtaining butter fats from cream, which comprises feeding cream to a container; subjecting the cream to an agitating operation to agglomerate the butter fats contained in the cream; displacing the agglomerated fats and the residue upwardly out of the whipping zone and discharging it at a higher level; and regulating the rate of feed of the cream in accordance with the pressure of the column of cream in the container.

4. The process of obtaining butter fats from cream, which comprises subjecting the cream to an agitating operation; continuously displacing the product from the agitating zone; feeding additional cream to the agitating zone to replace approximately the same weight of displaced product; passing the product continuously through a separating zone and separating therein the butter fats from the residue and then continuously passing the fats through a washing zone whereby substantially pure butter fats are obtained.

5. The process of obtaining butter fats from cream, which comprises passing the cream continuously through an agitating zone and agglomerating the fat globules therein; continuously discharging the product from the agitating zone into a separating zone; and separating butter-milk from the agglomerated fat in the separating zone; continuously discharging the agglomerated fat into a washing zone, and washing the agglomerated fat; and continuously discharging the washed agglomerated fat.

6. A continuous process of recovering butter fats from cream, which comprises continuously introducing cream into an agitating zone at a temperature sufficiently low to prevent emulsification of the fat globules contained in the cream and to assist in the agglomeration thereof and effecting the agglomeration of the fat globules therein; continuously removing the material treated and continuously withdrawing the resulting butter-milk from the agglomerated fat by the action of gravity; and washing the agglomerated fat.

7. A churn for the continuous separation of butter fats from cream, which comprises a churning chamber having an outlet in its upper portion for the substantially continuous dicharge of butter fats and a residue; agitating elements extending into the lower part of said chamber, there being a zone for agglomerated fats and residue above the agitating elements and below the level of said outlet; and means for feeding cream to the churning chamber at a rate to ensure the thorough breaking into butter of the fat globules contained in the cream and displacement of the butter fats and the residue upward from the agitating zone.

8. Apparatus for obtaining butter fats from cream, which comprises a churn; means for feeding cream into the churn; agitating elements in the churn arranged to cause the contained fats to break into butter; means for withdrawing butter fats and residue from the churn dependent on the pressure of the incoming cream; a container having a selective action between the butter fats and residue connected with the said withdrawing means; and a butter fat washer connected with said container and means for causing the butter fats to move through the container and washer; whereby the butter fats in the cream are agglomerated, the residue is separated therefrom and the butter fats are washed in a continuous operation.

CHARLES E. NORTH.